United States Patent [19]

Zaengerle

[11] Patent Number: 4,913,604
[45] Date of Patent: Apr. 3, 1990

[54] THREAD MILLING TOOL

[75] Inventor: Eduard Zaengerle, Ch-Baar-Zug, Switzerland

[73] Assignee: Vargus Ltd. Tool Manufacturing Co., Israel

[21] Appl. No.: 233,201

[22] Filed: Aug. 17, 1988

Related U.S. Application Data

[63] Continuation of Ser. No. 100,017, Sep. 23, 1987, abandoned.

[51] Int. Cl.$^4$ ............................................. B23C 3/32
[52] U.S. Cl. ................................... 409/74; 10/101 R; 407/113
[58] Field of Search ................ 407/113, 114; 409/74; 10/101 R, 111 R, 141 R

[56] References Cited

U.S. PATENT DOCUMENTS

| | | | |
|---|---|---|---|
| 1,410,451 | 3/1922 | Bullard et al. | 407/67 |
| 2,004,333 | 6/1935 | Maurer | 10/120 |
| 3,812,547 | 5/1974 | Reich | 10/101 R |
| 3,829,921 | 8/1974 | Delaney | 10/141 R |
| 4,312,250 | 1/1982 | Yankoff | 82/1 C |
| 4,360,297 | 11/1982 | Weber | 407/113 |
| 4,409,868 | 10/1983 | Huddle et al. | 82/1 C |
| 4,531,863 | 7/1985 | Smith | 407/113 |
| 4,575,888 | 3/1986 | Muren | 10/101 R |

FOREIGN PATENT DOCUMENTS

| | | | |
|---|---|---|---|
| 62621 | 10/1982 | European Pat. Off. | 407/113 |
| 0177242 | 8/1984 | European Pat. Off. | |
| 145167 | 6/1985 | European Pat. Off. | |
| 0145167 | 6/1985 | European Pat. Off. | |
| 3033626 | 4/1982 | Fed. Rep. of Germany | 407/113 |
| 130717 | 9/1919 | United Kingdom | |
| 596637 | 1/1948 | United Kingdom | 10/101 R |
| 670814 | 4/1952 | United Kingdom | 10/111 R |
| 1363542 | 8/1984 | United Kingdom | |

OTHER PUBLICATIONS

De-Z: Maschinen Markt, Würzburg, 92, 1986, 4, S.75.

Primary Examiner—Steven C. Bishop
Attorney, Agent, or Firm—Steele, Gould & Fried

[57] ABSTRACT

In a thread milling tool (1) with a trapezoidal reversible milling plate (3) fixed to a cutter shank (2), the longest edge face (10) on both plate sides (13, 14) is in each case provided with a separate milling edge (11, 12) and an associated chip surface (15, 16), the two toothed milling edges (11, 12) being formed by the same tooth system (21) extending over the thickness of edge face (10).

32 Claims, 2 Drawing Sheets

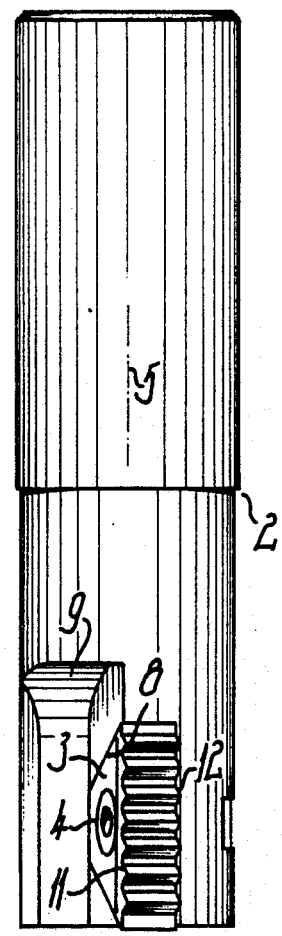
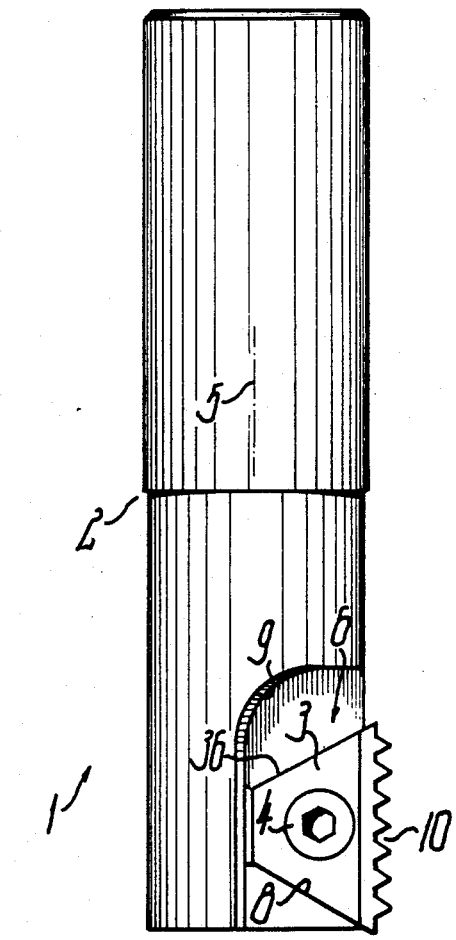
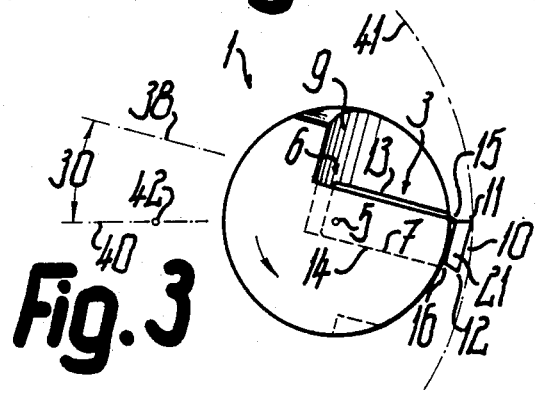
Fig. 2  Fig. 1
Fig. 3

THREAD MILLING TOOL

This is a continuation of prior application Ser. No. 100,017 filed Sept. 23, 1987, now abandoned.

FIELD OF THE INVENTION

The invention relates to a thread milling tool with a milling cutter shank having a rotation milling axis, said shank having a receptacle with alignment surfaces for the engagement of a one-piece, multitooth reversible thread milling plate. In accordance with the thread profile, the plate is toothed on at least one edge face over the plate thickness and with the plate edge of the particular edge face forms a thread milling edge located on the associated first plate side and is bounded by a rake surface, which is formed by a chip surface which is significantly inclined with respect to the plate plane.

PRIOR ART

EP-A-No. 0 145 167 discloses a thread milling cutter, which on a single plate side is constructed with thread milling edges on several edges of the thread milling plate, so that it can be turned over by rotating about an axis at right angles to its plate plane when one set of milling teeth has become used or worn. Such thread milling cutters can be used both for the production of internal threads and external threads and for performing the main working movement the milling cutter operates at a relatively high speed in an approximately parallel, but eccentric arrangement to the workpiece axis and for performing the advance movement, the workpiece is slowly turned around the workpiece axis. The thread milling edge can be at least as long as the length of the thread to the produced, so that up to the production of the thread, the workpiece essentially only performs a single revolution and simultaneously the milling cutter or workpiece is axially displaced by one thread lead for each workpiece revolution. However, the thread milling edge can also be shorter than the thread to be produced and then, appropriately, initially a first portion of the thread corresponding to the thread milling edge length is produced and then the milling cutter and workpiece are reciprocally displaced roughly by the length of the thread milling edge, followed by the production of a further thread portion until the thread has been produced with the predetermined length. The use of digitally controlled milling machines is particularly appropriate with this procedure. The thread milling edges of such milling tools are extremely sensitive, particularly in the case of fine precision threads, so that the arrangement of several thread milling edges on the same plate side is problematical because the milling edges not in use when working the milling edge which is in use can easily be damaged. In addition, in order to obtain two thread milling edges, two edge faces of the thread milling plate must be worked in toothed manner, which in particular makes difficult a precisely reproducible orientation of the milling plate with respect to the cutter shank, because toothed edge faces are less suitable for this purpose. It can also be problematical that in the known construction in order to obtain the same dimensional stability conditions after turning over the plate edges provided with the thread milling edges must be of the same length, which in the case of a relatively large thread length amounts to a correspondingly large radial extension of the thread milling plate with respect to the milling axis and causes problems in the case of small internal thread diameters.

SUMMARY OF THE INVENTION

An object of the present invention is to provide a thread milling cutter of the aforementioned type which, in the case of a simple construction, permits different constructional developments for numerous different possible uses. In addition, the milling cutter must be easy to handle, easy to regrind and compact.

In particular the first-mentioned object is achieved in the case of a thread milling cutter of the aforementioned type, in that also on the second plate side is provided at least one toothed thread milling edge, whose rake surface is formed by a chip surface inclined with respect to the plane of the milling plate. This thread milling edge is concealed on the rear side of the milling plate when using the other thread milling edge and is consequently largely protected from damage. By turning the milling plate about an axis parallel to its middle plane, said milling edge can at any time easily be brought into the use position. As a result of the chip surface its cutting behavior is also extremely advantageous, so that very high surface precisions can be obtained.

It is conceivable to provide the milling edges on both plate sides on different edge faces, so that apart from turning about an axis parallel to the middle plane of the plate, turning about a milling plate axis at right angles thereto is also necessary. In the case of such a construction, the milling edges can easily be constructed differently with regards to their teeth dimensions, e.g. in that they correspond to different threads or are constructed on the one hand as a premilling edge and on the other as a precision finishing edge. However, a particularly advantageous construction is obtained if two identical thread milling edges are formed by the two plate edges of at least one edge face and if the chip surfaces on both plate sides are identically constructed in a substantially mirror symmetrical manner to the plate middle plane. This permits a turnover exclusively through rotating about an axis parallel to the plate plane and at right angles to the associated edge face. It is particularly advantageous if thread milling edges are only provided on a single edge face or at least not on those edge faces which abut at an angle, because then in each case the edge faces of the milling plate abutting at an angle on the toothed edge face can be used as smooth or planar alignment or orientation edges.

If the teeth of the edge face pass uniformly over the plate thickness, it is merely necessary to work a single edge face for the construction of two identical milling edges. The similarity of the two milling edges can be further increased in that either the top or the bottom faces of the teeth of the edge face, or both the top and the bottom faces are in each case in a plane at right angles to the plate plane, which also facilitates significantly the tool alignment after turning, if the two plate sides form orientation faces which are plane-parallel to one another or are constructed as corresponding planar and optionally smooth surfaces.

It is also conceivable that, in a view of the associated edge face, the teeth are inclined, the inclination being e.g. chosen in such a way that the teeth on one plate side are displaced by one, two or more tooth spacings with respect to the teeth on the other plate side, so that after turning the same tool alignment is dimensionally stable. However, as this is generally only possible with those thread profiles, which bring about an adequate clearance angle with respect to the longitudinal sides of the teeth, a further simplification is obtained if, in a view of the edge face, the teeth are at right angles to the plate plane over the plate thickness.

As a function of the thread shape, it can also be advantageous if the teeth are irregular over the length of the edge face, e.g. the top or crest height thereof decreases towards one end of the edge face, so that a conically tapering thread can be produced. However, it is advantageous for simplifying working, maintaining and adjusting of the tool, if the teeth are uniform over the length of the edge face and also in this case an inclined thread can e.g. be produced in that the tool axis is inclined by a small angle with respect to the workpiece axis.

In order that the milling cutter can be used again in virtually identical alignment or orientation and without re-setting after reversing the milling plate, it is advantageous to construct the teeth in mirror symmetrical manner to the center of the length of the associated edge face. The teeth on both plate edges of the particular edge face are identical with respect to their tooth geometry to the associated orientation faces of the milling plate.

A high cutting speed with clean chip outflow can in particular be obtained if the milling edge has an acute cutting angle between 60° and 85° and preferably approximately 75°. This can e.g. be achieved in simple manner in that the chip surface is essentially under an acute angle, opening towards the associated edge face, between 5° and 30°, preferably approximately 15°, to the plate middle plane located between the two plate sides. As a result of the chip surfaces on both sides of the edge face, in the vicinity of the latter the cutting plate has an in particular symmetrical dovetail profile extending at the most up to the planes of the plate sides thereof and onto which, e.g. for protecting the milling edges, can be engaged a correspondingly profiled, e.g. ledge-like dome made from plastic or the like and this also permits a very favorable storage and retention of milling plates in e.g. vertical dovetail reception grooves of a retaining device. It is also possible to regrind or re-sharpen both milling edges in a single pass by simultaneously working both chip surfaces in a single pass, so that extremely simple tool maintenance is obtained.

The cutting behavior and regrindability can be further improved in that the chip surface connecting onto the milling edge is made substantially planar over most of its width or up to the bottom faces of the tooth. To ensure an even better outflow of chips, the chip surface appropriately rises at a distance from the milling edge or the bottom faces of the teeth towards the associated plate side under a larger angle compared with the angle of inclination in the vicinity of the milling edge, said angle being in particular approximately 45°. In order to avoid notch effects and to obtain an even smoother or more uniform outflow of chips, the chip surface at a distance from the milling edge passes substantially tangentially into a concave fillet, whose middle axis is preferably in the plane of the associated plate side and passes tangentially, i.e. in edge-free manner into the strip-like, planar, rising chip surface located at a distance from the milling edge.

It has proved to be advantageous if the total width of the chip surface is roughly half as large as the plate thickness of the thread milling plate, so that there is only a very limited plate thickness reduction. Despite a good chip flow in the vicinity of the bottom faces of the teeth, such a small chip surface width can also be obtained in that the lowest point of the chip surface is roughly the same distance from the bottom faces of the teeth as from the teeth-remote boundary of the chip surface.

Particularly if only a single edge face of the milling plate forms the milling edges, the milling edge is appropriately provided on the longest edge face of the milling plate, i.e. the axial extension of the milling plate with respect to the milling cutter is larger than the associated radial extension. However, a very good orientation of the milling plate can be obtained if it is trapezoidal and not, as is also conceivable, triangular, it being appropriate to have an acute trapezoidal angle of preferably approximately 60°, i.e. the orientation surfaces formed by edge faces of the milling plate are under an angle of approximately 60° to one another. The chip surface passes over the entire length of the associated edge face.

In order that the milling plate can be fixed in a reliable and uncomplicated manner with respect to the cutter shank, despite the compact construction, the milling plate is traversed immediately adjacent to the chip surface by a through hole for a clamping bolt. Appropriately on either side of the plate, this through hole is uniformly widened in frustum-shaped manner and under an acute taper angle of e.g. approximately 60°, in such a way that its boundary edge located in the particular plate side is contacted virtually tangentially by the chip surface. In the case of edge-side orientation surfaces of the milling plate engaging on the orientation surfaces of the cutter shank, the through hole or its frustum-shaped end portions are appropriately slightly eccentric with respect to the clamping bolt reception hole, such as a tapped hole, in the cutter shank, so that on tightening a clamping bolt engaging with an e.g. frustum-shaped head on the frustum-shaped extension, the milling plate is loaded or pressed against the orientation surfaces of the cutter shank.

For the protected reception of the milling plate, it is also advantageous if the receptacle for said plate is formed by a depression in the cutter shank adapted to its external shape and which forms the orientation surfaces for the milling plate, preferably exclusively by the base face thereof and two edge faces which are at an angle to one another.

In order to obtain favorable rake, clearance and chip angles of the particular milling edge in use, even in the case of very constricted space conditions and accompanied by simple adjustability, the milling axis is located between the planes of the plate sides of the milling plate, preferably roughly in the plane of the chip surface of the milling edge located in the milling position. Moreover, the milling axis can be at a smaller distance compared with the plate thickness from the plate edge remote from the toothed edge face and preferably parallel thereto, or can even be located essentially in said plate edge.

These and further features of preferred further developments of the invention can be gathered from the description and drawings, whereby the individual features can be realized in any embodiment of the invention and in other fields, either singly, or in the form of subcombinations.

BRIEF DESCRIPTION OF THE DRAWINGS

An embodiment of the invention is described relative to the drawings, wherein:

FIG. 1 is a inventive thread milling cutter in a view of the milling edge intended for use.

FIG. 2 is the milling cutter according to FIG. 1 in a view of the edge face associated with the milling edge.

FIG. 3 is the milling cutter according to FIG. 1 in a view of the front end face.

DETAILED DESCRIPTION OF THE PREFERRED EMBODIMENTS

Figure 4:
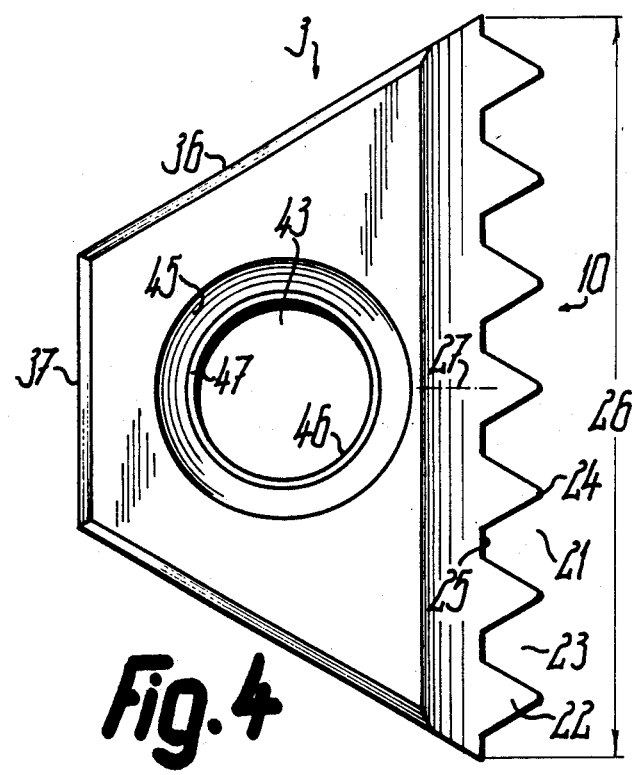
FIG. 4 is the milling plate in a position according to FIG. 1, but on a larger scale.

As can be gathered from FIGS. 1 to 6, an inventive thread milling cutter 1 can have solely three one-piece parts, namely a substantially cylindrical cutter shank 2, a substantially constantly thick milling plate 3 and a clamping bolt 4 provided with a countersunk head and a threaded shank.

The cutter shank 2 located in milling axis 5 and at whose working end roughly at half its length is slightly reduced in diameter compared with its clamped end, has immediately adjacent to its front end face a receptacle 6 for the milling plate 3 extending roughly over only half the length of the working end. Receptacle 6 is formed by a recess in a planar bottom surface located approximately in an axial plane of the cutter shank 2 of a chip enclosure or chamber 9 which, in a view of the bottom face, is angularly bounded, extends up to the front end face of the cutter shank 2 and over roughly more than half the length of its working end. The width of said chip chamber 9 at right angles to the cutter axis 5 is only slightly larger than the associated extension of the part of the milling plate 3 engaging in the cutter shank 2. The depth of receptacle 9 is approximately the same or only slightly smaller than the thickness of milling plate 3. The bottom surface of receptacle 6 parallel to the bottom surface of the chip chamber 9 forms one of three orientation or alignment surfaces 7, 8 which are at an angle to one another, namely the through planar orientation surface 7 which is approximately equal-area to the contour of milling plate 3, on which the latter engages with one plate side and which is traversed by the tapped hole for receiving the clamping bolt 4. The two other orientation surfaces 8 are formed by two edge faces of receptacle 6 diverging towards the outer circumference of cutter shank 2 and which are at an acute angle to one another. The orientation surface 8 adjacent to the front end of cutter shank 2 extends with its radially outer end approximately up to the associated front face of the cutter shank 2 at right angles to the cutter axis 5, while the corresponding end of the orientation surface 8 behind and facing it is spaced from the associated end of chip chamber 9.

Milling plate 3 which has a trapezoidal shape when viewed on its plate sides is provided exclusively on its longest edge face 10 formed by the base edge of the trapezoidal shape two remote milling edges 11, 12 located on both plate sides 13, 14, which are in each case only slightly set back from the plane of the associated plate sides 13, 14 and which are identical with respect to their geometrical shape. With each milling edge 11, 12 is associated a filleted, obtuse-angled, angular groove-like chip surface 15, 16, whose planar portion connecting onto the tooth milling edges 11, 12 forms the rake surfaces 17, 18. Thus, along edge face 10, milling plate 3 has a dovetail edge profile, whose smallest thickness is approximately a quarter smaller than the plate thickness 20 of milling plate 3, the dovetail profile being symmetrical to the plate middle plane 19.

The milling edges 12, 13 uniformly toothed under an acute flank angle of 60° over the length of edge face 10 are formed by a tooth system 21 on edge face 10 passing over the plate thickness 20. Teeth 22 and tooth gaps 23 of said tooth system 22 are uninterrupted over the height of the edge face or the particular associated thickness of milling plate 3. Both the tooth top or crest 24 on the one hand and the bottom faces 25 of the tooth gaps 23 on the other are in a common plane parallel to the longitudinal direction of edge face 10 and at right angles to the plate middle plane 19, the tooth crest 24 being slightly rounded and the bottom faces 25 planar in such a way that they pass in obtuse-angled manner into the planar tooth sides. The depth of the tooth gaps 23 is roughly half the total width of the particular chip surface, measured between the tooth crests and the boundary remote therefrom. At the two ends of edge face 10 are provided instead of tooth sides or teeth 22, portions of bottom faces 25 of tooth gaps bounded only on one side by flanks and connected onto the outermost teeth. The width of said terminal bottom faces 25 exceeds half the width of the middle bottom faces and is preferably smaller than the width of such a bottom face. The edge face 10 or milling edges 11, 12 or tooth system 21 are symmetrical to a middle plane 27 at right angles to the plate middle plane 19 and edge face 10 and which passes through the center of length 26 of edge face 10. The entire milling plate 3 is mirror symmetrical to said middle plane 27.

Figure 5:
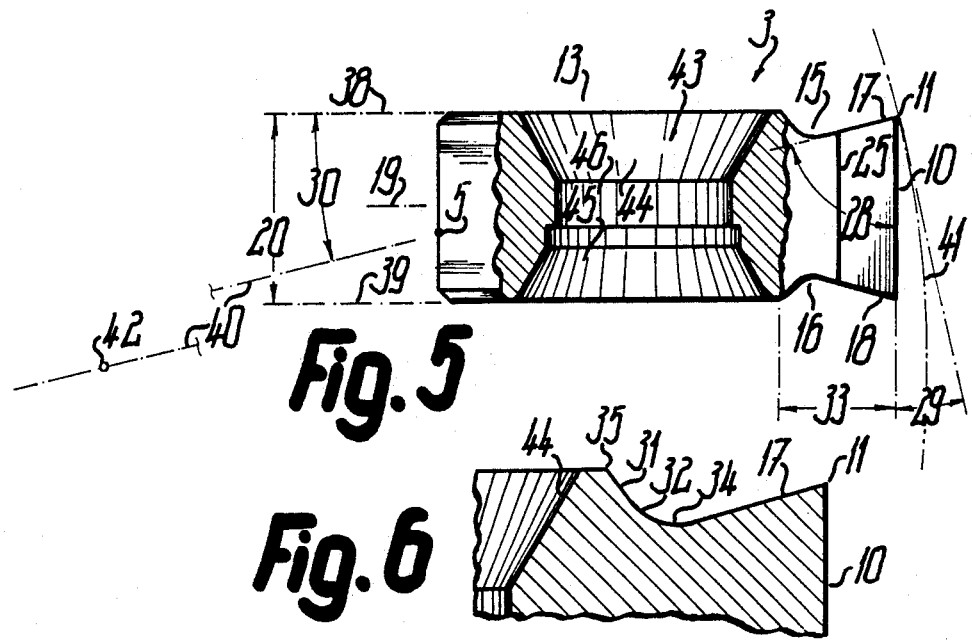
FIG. 5 is the milling plate according to FIG. 4, partly in section.
Figure 6:
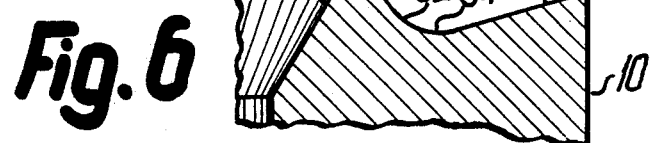
FIG. 6 is a detail of FIG. 5 on a larger scale.

FIGS. 3 and 5 indicate in dot-dash line manner, the cylindrical inner contour of a workpiece 41, into which is to be milled an internal thread. This inner contour coinciding with the internal or core diameter is represented in a position, in which, with respect to the milling edge 11 intended for milling use, it must be moved to thread depth, the milling cutter or milling plate 3 or milling edge 11 being shown in the position in which, on rotation about milling axis 5, it engages deepest in the workpiece, i.e. the milling edge 11 or the associated rake surface 17 is located in the common axial plane of milling axis 5 and workpiece axis 42. The rake angle of milling edge 11 is designated 28 and is in the represented embodiment 75°. With respect to workpiece 41, in said position there is an average clearance angle 29 of approximately 15° and the rake angle 30 is also approximately 15°.

Chip surface 15 or 16 is smooth-surfaced throughout, but is traversed by tooth system 21 over roughly half its width and apart from the portion forming the particular rake surface 17 or 18 has on the side remote from edge face 10 a relatively steeply rising portion 31 towards the associated plate side 13, 14. These two portions which are at an obtuse angle of approximately 115° to one another in cross-section pass tangentially into one another over an approximately pitch circle-like or smaller than quadrant-like fillet 32, whose middle axis in the plane or the associated plate side 13 or 14 is at a greater distance from edge face 10 than from the remote boundary 35 of chip surface 15 or 16. At this angular boundary 35, portion 31 of chip surface 15 or 16 passes in cross-section in obtuse-angled manner into the associated plane and to the plate side 13 or 14 parallel to the plate middle plane 19. Boundary 35 also determines the total width 33 of chip surface 15 or 16, whose deepest point 34 is located in the vicinity of fillet 32 and defines the thinnest zone of milling plate 3.

The substantially planar edge faces 36 of milling plate 3 connected at an acute angle to edge face 10 are located in mirror symmetrical manner on either side of middle plane 27 and at an acute angle to one another, the length thereof being approximately one third shorter than the length 26 of edge face 10. Edge face 37 connected in obtuse-angled manner to edge faces 36, remote from edge face 10 and parallel thereto is also planar, but is not used for engagement or orientation in cutter shank 2, i.e. is substantially contact-free therein. Its length is approximately one third of the length 26 of edge face 10. All the edge faces 10, 36, 37 are at right angles to the planes 38, 39 of the two plate sides 13, 14, the edges of edge faces 36, 37 on both plate sides 13, 14 being chamfered in such a way that at the ends of the chip surfaces 15, 16 they do not extend with said chamfers up to the particular fillet 32 and at the most only extend to roughly half the height of the associated rising portion 31. The axial plane of the milling tool passing through the tips and bottom edges of milling edge 11 is designated 40.

Immediately adjacent to chip surfaces 15, 16, milling plate 3 is traversed by a centrosymmetrical through hole 23, whose central axis is at right angles to the plate middle plane in middle plane 27 and with respect to edge face 37 has an e.g. approximately one quarter smaller distance than with respect to the plane of the tooth crest 24. Through hole 43 has or forms on both plate sides 13, 14 acute-angled, frustum-shaped end portions 44, 45 with a 60° taper angle, which with respect to the maximum diameter thereof and with respect to the taper angle are identical and can also have the same axial extension of approximately one third of the plate thickness 20. Between said two end portions 44, 45 is provided a cylindrical central portion 46, whose diameter corresponds to the smallest diameter of at least one end portion 44, the diameter of central portion 46 being larger with respect to the shank of clamping bolt 4 by the same amount as the diameter of end portion 44, 45 compared with the frustum-shaped head of bolt 4 having the same taper angle, so that the latter in the direction of edge face 37 can engage in staggered eccentric manner in through hole 43 and exclusively engages linearly with its head on the side of the associated end portion 44, 45 remote from edge face 10. Thus, on tightening the clamping bolt 4, apart from a force directed counter to orientation surface 7, a force drawing milling plate parallel to said surface 7 into receptacle 6 is exerted on said plate, so that by tightening a single clamping bolt 4, said plate is also tensioned under pressure against the orientation surface 8 and is consequently adjusted in a precisely determinable manner. In the represented embodiment between cylindrical central portion 46 and the shorter of the two end portions 44, 45, is provided a cylindrical intermediate portion 47 of through hole 43, whose diameter is slightly larger than that of central portion 46 and the same as the smallest diameter of the associated end portion 45, but whose axial extension is much smaller than that of all the remaining portions. Intermediate portion 47 forms a shoulder face at right angles to the central axis of through hole 43, as well as a cylindrical centring face connected thereto and can be used for the precise orientation of milling plate 3 at right angles to the plate middle plane 19, as well as in all directions radial to the central axis of through hole 43, e.g. for working, regrinding and the like with respect to milling plate 3. It is also conceivable to provide such intermediate portions 47 on both ends of the central portion 46 or on both inner ends of end portions 44, so that through hole 43 is also constructed mirror symmetrically to the plate middle plate 19. Through hole 43 is roughly at the same distance from edge faces 36 as from edge face 37.

I claim:

1. A thread milling tool for cutting a thread having a thread profile, said tool comprising:
   a one-piece, multi-toothed thread milling plate constructed as a reversible plate, said milling plate having first and second plate sides on both sides of a plate plane, and further having edge faces, at least one plate edge and a plate thickness, said milling plate in accordance with the thread profile having a serration extending substantially over the entire plate thickness on at least one edge face, thereby forming on at least one plate edge of said at least one edge face a toothed thread milling edge located on at least one of said first and second plate sides, said milling edge being bounded by a rake surface formed by a chip surface, said milling edge providing top and bottom faces of said serration, and wherein said chip surface has a total width extending between said top faces and a chip surface boundary remote from said serration, said total width of the chip surface being substantially half as large as the plate thickness of the thread milling tool.

2. A thread milling tool according to claim 1, wherein also on the second plate side is provided at least one toothed threaded milling edge having a rake surface formed by a chip surface substantially inclined with respect to the plate plane of the milling plate.

3. A milling tool according to claim 2, wherein the serration has top and bottom faces, said top faces of the serration in the edge face being located in a plane at right angles to the plate plane.

4. A milling tool according to claim 2, wherein the milling edge has an acute rake angle of a rake surface, said rake angle being between 60° and 85° and defining an inclination angle with respect to the associated plate side.

5. A milling tool according to claim 4, wherein said rake angle is substantially 75°.

6. A milling tool according to claim 4, wherein the chip surface at a distance from the milling edge rises to the associated plate side by a slope angle greater than the inclination angle.

7. A milling tool according to claim 6, wherein said slope angle is substantially 45°.

8. A milling tool according to claim 2, wherein the chip surface in the vicinity of a connection to the milling edge is located under an acute angle to said plate plane, said acute angle opening towards the associated edge face, said acute angle being between 5° and 30°.

9. A milling tool according to claim 8, wherein said acute angle is substantially 15°.

10. A milling tool according to claim 1, wherein the chip surface at a distance from the milling edge passes substantially tangentially into a concave fillet.

11. A milling tool according to claim 10, wherein the fillet has a central axis of curvature, said central axis being located substantially in a plane of the associated plate side.

12. A milling tool according to claim 1, wherein two identical thread milling edges are formed by two plate edges of at least one edge face, the chip surfaces on both plate sides being identically constructed in substantially mirror symmetrical manner.

13. A milling tool according to claim 1, wherein the serration of the edge faces passes substantially uniformly over the plate thickness.

14. A milling tool according to claim 1, wherein the serration has top and bottom faces, said bottom faces of the serration in the edge face being located in a plane at right angles to the plate plane.

15. A milling tool according to claim 1, wherein the serration extends over the plate thickness at right angles to the plate plane.

16. A milling tool according to claim 1, wherein the serration extends uniformly over a length extension of the edge face.

17. A milling tool according to claim 1, wherein the chip surface in the vicinity of the connection to the milling edge is substantially planar.

18. A milling tool according to claim 1, wherein the chip surface has a width, said chip surface being substantially planar over most of said width.

19. A milling tool according to claim 1, wherein the chip surface is planar up to the bottom faces of the serration.

20. A milling tool according to claim 1, wherein the milling axis is located between the planes of the plate sides of the milling plate.

21. A thread milling tool for cutting a thread having a thread profile, said tool comprising:
a one-piece, multi-toothed thread milling plate constructed as a reversible plate, said milling plate having first and second plate sides on both sides of a plate plane, and further having edge faces, at least one plate edge and a plate thickness, said milling plate in accordance with the thread profile having a serration extending substantially over the entire plate thickness on at least one edge face, thereby forming on at least one plate edge of said at least one edge face a toothed thread milling edge located on at least one of said first and second plate sides, said milling edge being bounded by a rake surface, said milling edge defining bottom faces of said serration, and wherein the edge face has ends, at least one end of the edge face being formed by a portion of a bottom face of said serration.

22. A thread milling tool for cutting a thread having a thread profile, said tool comprising:
a one-piece, multi-toothed thread milling plate constructed as a reversible plate, said milling plate having first and second plate sides on both sides of a plate plane, and further having edge faces, at least one plate edge and a plate thickness, said milling plate in accordance with the thread profile having a serration extending substantially over the entire plate thickness on at least one edge face, thereby forming on at least one plate edge of said at least one edge face a toothed thread milling edge located on at least one of said first and second plate sides, said milling edge being bounded by a rake surface formed by a chip surface, and wherein the milling plate has a single longest edge face, said milling edge being provided on the longest edge face.

23. A thread milling tool for cutting a thread having a thread profile, said tool comprising:
a one-piece, multi-toothed thread milling plate constructed as a reversible plate, said milling plate having first and second plate sides on both sides of a plate plane, and further having edge faces, at least one plate edge and a plate thickness, said milling plate in accordance with the thread profile having a serration extending substantially over the entire plate thickness on at least one edge face, thereby forming on at least one plate edge of said at least one edge face a toothed thread milling edge located on at least one of said first and second plate sides, said milling edge being bounded by a rake surface formed by a chip surface, and wherein the milling plate is trapezoidal.

24. A thread milling tool for cutting a thread having a thread profile, said tool comprising:
a cutter shank defining a milling axis for tool rotation;
a one-piece, multi-toothed thread milling plate having first and second plate sides on both sides of a plate plane, and further having edge faces, at least one plate edge and a plate thickness, said milling plate in accordance with the thread profile having a serration extending substantially over the entire plate thickness on at least one edge face, thereby forming on at least one plate edge of said at least one edge face a toothed thread milling edge located on the associated first plate side, said milling edge being bounded by a rake surface formed by a chip surface; and,
wherein the milling plate has an edge face remote from the serration, said milling axis being located substantially in a plane of the edge face remote from the serration.

25. A milling tool according to claim 21, 22, 23 or 24 wherein the edge face has a center of the length extension, said serration being constructed in mirror symmetrical manner to the center of the length extension of the edge face.

26. A milling tool according to claim 22, wherein the chip surface extends over the entire length of the associated longest edge face.

27. A thread milling tool for cutting a thread having a thread profile, said tool comprising:
a one-piece, multi-toothed thread milling plate constructed as a reversible plate, said milling plate having first and second plate sides on both sides of a plate plane, and further having edge faces, at least one plate edge and a plate thickness, said milling plate in accordance with the thread profile having a serration extending substantially over the entire plate thickness on at least one edge face, thereby forming on at least one plate edge of said at least one edge face a toothed thread milling edge located on at least one of said first and second plate sides, said milling edge being bounded by a rake surface formed by a chip surface substantially inclined with respect to the plate plane, said milling edge providing bottom faces of said serration, and wherein said chip surface has a deepest point, said deepest point of the chip surface being substantially at a same distance from the bottom faces of the serration as from the chip surface boundary remote from the serration.

28. A thread milling tool for cutting a thread having a thread profile, said tool comprising:
a one-piece, multi-toothed thread milling plate constructed as a reversible plate, said milling plate having first and second plate sides on both sides of a plate plane, and further having edge faces, at least one plate edge and a plate thickness, said milling plate in accordance with the thread profile having a serration extending substantially over the entire plate thickness on at least one edge face, thereby forming on at least one plate edge of said at least one edge face a toothed thread milling edge located on at least one of said first and second plate sides, said milling edge being bounded by a rake surface formed by a chip surface substantially inclined with respect to the plate plane, and wherein in a substantially boundary-defining manner with respect to the chip surface the milling plate is traversed by a through hole for a clamping bolt.

29. A milling tool according to claim 28, wherein said through hole (43) is uniformly widened in frustum-shaped manner on both plate sides (13, 14), thereby forming boundary edges in both plate sides (13, 14), said boundary edges located in each plate side (13, 14) being substantially tangentially contacted by the chip surface (15, 16).

30. A thread milling tool for cutting a thread having a thread profile, said tool comprising:
    a cutter shank defining a milling axis for tool rotation;
    a one-piece, multi-toothed thread milling plate constructed as a reversible plate, said milling plate having first and second plate sides on both sides of a plate plane, and further having edge faces, at least one plate edge and a plate thickness, said milling plate in accordance with the thread profile having a serration extending substantially over the entire plate thickness on at least one edge face, thereby forming on at least one plate edge of said at least one edge face a toothed thread milling edge located on at least one of said first and second plate sides, said milling edge being bounded by a rake surface formed by a chip surface;
    a receptacle on said cutter shank, said receptacle having orientation surfaces for engaging said milling plate, and, wherein the receptacle for the milling plate is formed by a depression in the cutter shank, said depression being adapted to a trapezoidal external shape of the milling plate.

31. A thread milling tool for cutting a thread having a thread profile, said tool comprising:
    a cutter shank defining a milling access for tool rotation;
    a one-piece, multi-toothed thread milling plate constructed as a reversible plate, said milling plate having first and second plate sides on both sides of a plate plane, and further having edge faces, at least one plate edge and a plate thickness, said milling plate in accordance with the thread profile having a serration extending substantially over the entire plate thickness on at least one edge face, thereby forming on at least one plate edge of said at least one edge face a toothed thread milling edge located on at least one of said first and second plate sides, said milling edge being bounded by a rake surface substantially inclined with respect to the plate plane;
    a receptacle on said cutter shank, said receptacle having orientation surfaces for engaging said milling plate, and, wherein the receptacle for the milling plate is formed by a depression in the cutter shank, said depression being adapted to a trapezoidal external shape of the milling plate, said depression having a bottom face and two edge faces located at an angle to one another, said bottom face and edge faces forming the orientation surfaces for the milling plate.

32. A thread milling tool for cutting a thread having a thread profile, and defining a milling axis for an operating rotation, said tool comprising:
    a one-piece, multi-toothed thread milling plate constructed as a reversible plate, said milling plate having first and second plate sides on both sides of a plate plane, and further having edge faces, at least one plate edge and a plate thickness, said milling plate in accordance with the thread profile having a serration extending substantially over the entire plate thickness on at least one edge face, thereby forming on at least one plate edge of said at least one edge face a toothed thread milling edge located on at least one of said first and second plate sides, said milling edge being bounded by a rake surface formed by a chip surface substantially inclined with respect to the plate plane; and,
    wherein said rake surface defines a plane, said milling axis being located substantially in the plane of the rake surface of the milling edge provided in a milling position.

* * * * *